No. 770,730. Patented September 20, 1904.

UNITED STATES PATENT OFFICE.

LOUIS EMILE MULLER, DIT LOUIS D'EMILE MULLER, OF PARIS, FRANCE.

CARBORUNDO CEMENT.

SPECIFICATION forming part of Letters Patent No. 770,730, dated September 20, 1904.

Application filed July 12, 1904. Serial No. 216,283. (No specimens.)

*To all whom it may concern:*

Be it known that I, LOUIS EMILE MULLER, dit LOUIS D'EMILE MULLER, of Paris, France, have invented a new and useful Pulverulent Substance Called "Carborundo Cement," which invention is fully set forth in the following specification.

This invention relates to the preparation of a composition of matter which I call "carborundo cement," designed to form at once when mixed with water a paint, mortar, or coating to be applied to the surface of walls or materials serving for the construction of fireplaces, furnaces, ducts, retorts, receptacles, or on any coatings to protect them against the action of fire, hot gases, acid, and corrosive substances.

In making my product I add to the silicide of carbon or carbid of silicium various substances which are chosen according to the kind of application to be made with the product or the nature of destructive action to avoid.

I will describe as an example two different ways of effecting my new product. The ingredients may be taken either by weight or by volume.

1. If designed to be applied on the walls of a furnace in order to preserve the more or less refractory brickwork, the mixture or product will be composed as follows: silicide of carbon, ninety to sixty; refractory clay, ten to forty; lime, naught to four; silicate of an alkali metal, such as sodium or potassium, (47° Baumé,) twenty to fifty. These substances thoroughly mixed and finely ground are dried, then ground again in order to destroy any agglomeration resulting from the drying. To make use of this pulverulent powder, it is only necessary to dilute the same with water in a suitable proportion, so as to obtain, as the case may be, a kind of liquid or semi-liquid paint or else a real mortar or cement. Moreover, the said product may be used as a badigeon or still as a plaster to be applied with the trowel or a grout to join the said parts to be preserved.

2. If it is desired to avoid the action of chemicals, I make other mixtures, the proportions varying within certain limits in the following manner: silicide of carbon or carborundum, fifty to eighty-five; calcined magnesia or magnesite, five to fifteen; fine sand, ten to twenty-five. These materials are also ground very finely, and the mixture thus obtained is tempered with saturated chlorid of magnesium.

It will be understood that the nature of the substances mixed with the carborundum may vary as well as the nature of the tempering liquid, for it depends both upon the physical or chemical action which it is desired to avoid and upon the reactions which will determine the sticking of the coating on the materials to be protected.

In using the mixture No. 1 it is only necessary to dilute the carborundo cement with pure water, and the fire completes the reaction in melting the silicate and bringing the coating to the state of a regular protective glazing. With the mixture No. 2 it is not necessary to use the action of the fire, the reaction of the chlorid of magnesium on the magnesia producing immediately the hardening, and consequently the adhesion.

Carborundum or silicide of carbon can be replaced by similar compounds obtained by smelting in the electric furnace, such as metallic carbids and borids which have the same properties. In other cases the oxychlorids containing carborundum or other metallic carbids or borones may be produced on the spot, and thus adhere to the material to protect.

I claim—

1. A composition of matter in a pulverulent condition containing silicide of carbon, and a binding and hardening agent consisting of refractory clay, an alkali silicate and lime.

2. A composition of matter in pulverulent condition containing silicide of carbon and a binding and hardening agent consisting of refractory clay and a silicate of an alkali metal and lime.

5. A composition of matter in pulverulent condition containing silicide of carbon and a binding and hardening agent consisting of refractory clay and silicate of sodium and lime.

In witness whereof I have hereunto signed my name in the presence of two subscribing witnesses.

LOUIS EMILE MULLER, DIT
    LOUIS D'EMILE MULLER.

Witnesses:
  HANSON C. CORCE,
  JULES ARMENGAUD, Jeune.

*See Stowell, 774,003, Nov. 1, 1904 (134-45).*